United States Patent
Kim et al.

(10) Patent No.: US 9,055,593 B2
(45) Date of Patent: Jun. 9, 2015

(54) METHOD AND APPARATUS FOR TRANSCEIVING CHANNEL TRANSMIT POWER INFORMATION IN A WIRELESS COMMUNICATION SYSTEM

(75) Inventors: Eunsun Kim, Anyang-si (KR); Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 235 days.

(21) Appl. No.: 13/814,695

(22) PCT Filed: Dec. 29, 2011

(86) PCT No.: PCT/KR2011/010287
§ 371 (c)(1),
(2), (4) Date: Feb. 6, 2013

(87) PCT Pub. No.: WO2012/091478
PCT Pub. Date: Jul. 5, 2012

(65) Prior Publication Data
US 2013/0130731 A1    May 23, 2013

Related U.S. Application Data

(60) Provisional application No. 61/428,235, filed on Dec. 30, 2010, provisional application No. 61/431,434, filed on Jan. 11, 2011, provisional application No. 61/432,199, filed on Jan. 12, 2011, provisional application No. 61/435,352, filed on Jan. 24, 2011.

(51) Int. Cl.
*H04B 17/00*    (2006.01)
*H04W 72/08*    (2009.01)
(Continued)

(52) U.S. Cl.
CPC .......... *H04W 72/082* (2013.01); *H04W 52/146* (2013.01); *H04W 52/367* (2013.01); *H04W 52/58* (2013.01); *H04W 16/14* (2013.01)

(58) Field of Classification Search
CPC ............................ H04W 72/082; H04W 52/36
USPC .............. 455/501, 69, 500, 67.11, 67.13, 77, 455/507, 511, 509, 452.1; 370/329, 310, 370/338, 252
See application file for complete search history.

(56) References Cited

U.S. PATENT DOCUMENTS

| | | | |
|---|---|---|---|
| 2004/0137905 | A1 | 7/2004 | Jeong et al. |
| 2010/0046440 | A1* | 2/2010 | Singh ............................ 370/329 |
| 2010/0195580 | A1* | 8/2010 | Samarasooriya et al. .... 370/329 |
| 2010/0255794 | A1* | 10/2010 | Agnew ............................. 455/77 |

FOREIGN PATENT DOCUMENTS

| | | | |
|---|---|---|---|
| JP | 2004-229278 A | 8/2004 |
| JP | 2012-060453 A | 3/2012 |

(Continued)

OTHER PUBLICATIONS

Asai et al., "802.11 TGac WG Letter Ballot LB187: Proposed resolutions to comments on country elements and operating classes", IEEE 802.11-12/0529r0 Wireless LANs, May 2012, pp. 1-4.

(Continued)

*Primary Examiner* — John J Lee
(74) *Attorney, Agent, or Firm* — Birch, Stewart, Kolasch & Birch, LLP

(57) ABSTRACT

Disclosed are a method and apparatus for transceiving channel transmit power information in a wireless communication system. According to one embodiment of the present invention, transmit power information for the channel available for the device which operates in a television band may be signaled for each individual channel.

12 Claims, 16 Drawing Sheets

(51) Int. Cl.
*H04W 52/14* (2009.01)
*H04W 52/36* (2009.01)
*H04W 52/58* (2009.01)
*H04W 16/14* (2009.01)

(56) References Cited

FOREIGN PATENT DOCUMENTS

| JP | 2012-134650 A | 7/2012 |
|---|---|---|
| WO | WO 2009/136760 A1 | 11/2009 |
| WO | WO 2011/096746 A2 | 8/2011 |

OTHER PUBLICATIONS

Kim et al., "Normative Text for White Space Map (WSM) Notification", IEEE P802.11 Wireless LANs, IEEE 802.11-10/1040r4, Nov. 2, 2010, pp. 1-8.
Kim, "Notification of available channel list in TVWS", IEEE 802.11-10/1235r0, Nov. 2, 2010, 12 slides.
Song et al., "Proposed Changes related to Dynamic Channel Power Management", IEEE P802.11 Wireless LANs, IEEE 802.11-10/0767r1, Jul. 14, 2010, pp. 1-23.
Sun et al., "Network channel control with spectrum mask", IEEE P802.11 Wireless LANs, IEEE 802.11-10/1232r2, Nov. 9, 2010, pp. 1-11.
D. Gurney, et al., "Geo-location Database Techniques for Incumbent Protection in the TV White Space", DySPAN 2008, 3rd IEEE Symposium on new frontiers in dynamic spectrum access networks, 2008, USA, IEEE, Oct. 14, 2008, pp. 1-9.
P. Bahl, et al., "White Space Networking with Wi-Fi Like Connectivity", SIGCOMM '09 Proceedings of the ACM SIGCOMM 2009 Conference on data communication, USA, ACM, Oct. 2009, vol. 39, No. 4, pp. 27-38.
Country Information Element, IEEE 802.11d 4-05/03, May 14, 2003, pp. 1-4.

\* cited by examiner

FIG. 6
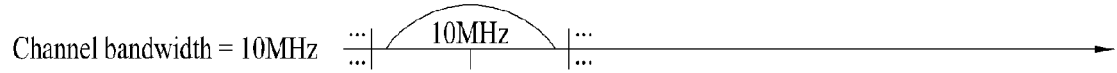
(a) Contiguous channels
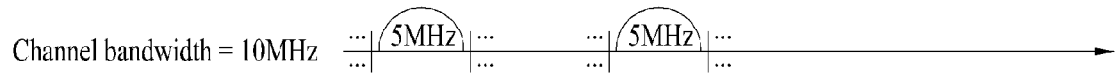
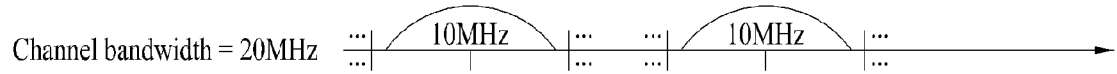
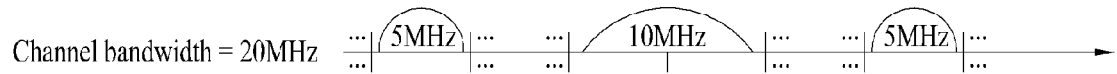
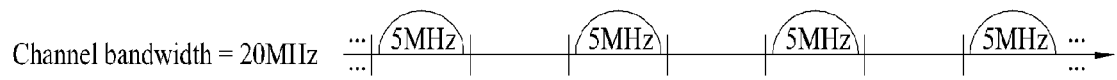
(b) Non-contiguous channels

| Element ID | Length | Local Power Constraint |
|---|---|---|
| 1 | 1 | 1 |

Octets:

(b)

One or more Channel Power Constraint

| Element ID | Length | Channel Power Constraint |
|---|---|---|
| 1 | 1 | n |

Octets:

(c)

| Channel Bandwidth | Local Power Constraint |
|---|---|
| 1 | 1 |

Octets:

(d)

| Channel Number | Local Power Constraint |
|---|---|
| 1 | 1 |

Octets:

| Channel Number | Channel Bandwidth | Local Power Constraint |
|---|---|---|

Octets: 1 | 1 | 1

(b)

These three fields are repeated according to the Length value

| Channel Number | Channel Bandwidth | Local Power Constraint |
|---|---|---|

Octets: 1 | 1 | 1

(c)

These two fields are repeated according to the Length value

| Channel Bandwidth | Channel Number | Local Power Constraint |
|---|---|---|

Octets: 1 | 1 | 1

(d)

This field is repeated according to the Length value

| Channel Bandwidth | Channel Number | Local Power Constraint |
|---|---|---|

Octets: 1 | 1 | 1

FIG. 11

| Element ID | Length | Country String | Country Field Triplets | Pad (If needed) |
|---|---|---|---|---|
| Octets: 1 | 1 | 3 | N x 3 | 0 or 1 |

FIG. 12

| Element ID | Length | Country String | First Channel Number / Operating Extension Identifier | Number of Chnnels / Operating Class | Maximum Transmit Power Level / Coverage Class | Pad (If needed) |
|---|---|---|---|---|---|---|
| 1 | 1 | 3 | 1 | 1 | 1 | 0 or 1 |

These three fields are repeated, as determined by the Length field

Octets:

| Element ID | Length | Channel Index | Operating Class | Channel Number | Maximum Transmit Power Level |
|---|---|---|---|---|---|

Octets: 1 1 1 1 1 1

These four fields are repeated according to the Length value (b)

| Element ID | Length | Number of Channel | Operating Class | Channel Number | Maximum Transmit Power Level |
|---|---|---|---|---|---|

Octets: 1 1 1 1 1 1

These three fields are repeated according to the Length value (c)

| Element ID | Length | Number of Channel | Operating Class | Channel Number | Maximum Transmit Power Level |
|---|---|---|---|---|---|

Octets: 1 1 1 1 1 1 repeated x # of non-contiguous CH repeated x Number of Channel

METHOD AND APPARATUS FOR TRANSCEIVING CHANNEL TRANSMIT POWER INFORMATION IN A WIRELESS COMMUNICATION SYSTEM

This application is the National Phase of PCT/KR2011/010287 filed on Dec. 29, 2011, which claims priority under 35 U.S.C. 119(e) to the U.S. Provisional Application Nos. 61/428,235 filed on Dec. 30, 2010, 61/431,434 filed on Jan. 11, 2011, 61/432,199 filed on Jan. 12, 2011 and 61/435,352 filed on Jan. 24, 2011, all which are hereby expressly incorporated by reference into the present application.

TECHNICAL FIELD

The following description relates to a method and apparatus for transmitting and receiving channel transmit power information in a wireless communication system.

BACKGROUND ART

A standard of a wireless local area network (WLAN) technology is being developed as a standard of Institute of Electrical and Electronics Engineers (IEEE) 802.11. IEEE 802.11a and IEEE 802.11b use an unlicensed band at 2.4 GHz or 5 GHz and IEEE 802.11b provides a transfer rate of 11 Mbps and IEEE 802.11a provides a transfer rate of 54 Mbps. IEEE 802.11g applies Orthogonal Frequency Division Multiplexing (OFDM) at 2.4 GHz to provide a transfer rate of 54 Mbps. IEEE 802.11n applies multiple input multiple output-OFDM (MIMO-OFDM) to provide a transfer rate of 300 Mbps for 4 spatial streams. IEEE 802.11n supports a channel bandwidth of up to 40 MHz. In this case, IEEE 802.11n provides a transfer rate of 600 Mbps.

IEEE 802.11af is a standard for defining operation of an unlicensed device in a TV whitespace (TVWS) band.

The TVWS band, which is a frequency band allocated to a broadcast TV, includes an Ultra High Frequency (UHF) band and a Very High Frequency (VHF) band. Specifically, the TVWS band is a frequency band which is allowed to be used by an unlicensed device under a condition that this does not hinder communication of a licensed device that operates in the frequency band. The licensed device may include a TV or a wireless microphone. The licensed device may be referred to as an incumbent user or a primary user. To overcome the problem of coexistence of unlicensed devices, a signaling protocol such as a common beacon frame, a frequency mechanism, or the like may be required for the unlicensed devices.

Operations of all unlicensed devices are permitted in a band of 512-608 MHz and a band of 614-698 MHz. However, only communication between fixed devices is permitted in bands of 54-60 MHz, 76-88 MHz, 174-216 MHz, and 470-512 MHz. The term "fixed device" refers to a device that performs signal transmission only at a fixed location. An IEEE 802.11 TVWS terminal is an unlicensed device that operates, in the TVWS spectrum, using IEEE 802.11 media access control (MAC) and physical (PHY) layers.

An unlicensed device that desires to use the TVWS band should provide a function to protect licensed devices. Accordingly, the unlicensed device should check whether or not a licensed device occupies the band before the unlicensed device starts signal transmission.

To accomplish this, the unlicensed device may check whether or not the band is being used by a licensed device by performing spectrum sensing. Examples of the spectrum sensing mechanism include an energy detection scheme and a feature detection scheme. The unlicensed device may determine that a licensed device is using a specific band when the intensity of a received signal is greater than a specific level or when a DTV preamble is detected. Upon determining that a licensed device is operating in a channel that is immediately adjacent to a channel currently used by the unlicensed device, the unlicensed device should reduce transmit power.

In addition, an unlicensed device should access a database (DB) through the Internet or a private network to acquire information of a list of channels that the unlicensed device can use in a corresponding region. The DB stores and manages information of licensed devices registered in the DB and channel usage information which dynamically changes according to the geo-location and usage time of the licensed devices.

In the description of this specification, the whitespace band may include, but need not be limited to, the TVWS described above. The term "whitespace band" in this specification refers to a band in which operation of a licensed device is preferentially allowed and operation of an unlicensed device is allowed only when licensed device protection is provided. The term "whitespace device" refers to a device that operates in the whitespace band. A device according to the IEEE 802.11 system may be an example of the whitespace device. In this case, the term "whitespace device" may refer to an unlicensed device that operates using 802.11 Medium Access Control (MAC) and Physical (PHY) layers in the whitespace band. That is, a general AP and/or STA according to the 802.11 standard which operates in the whitespace band may be an example of the unlicensed device.

DISCLOSURE

Technical Problem

An unlicensed device which operates in the whitespace band as described above may acquire information regarding channels available to the unlicensed device and may operate in the whitespace band using the acquired information. Here, when a channel for an incumbent user is present in a frequency adjacent to a channel available to the unlicensed device, operation of the unlicensed device may cause interference to the channel of the incumbent user. Thus, the transmit power of the channel available to the unlicensed device may be reduced to protect the incumbent user. That is, to remove or reduce interference caused by operation of an unlicensed device in the whitespace, there is a need to signal a channel available to the unlicensed device and a transmit power limit value applied to the available channel.

Therefore, it is an object of the present invention to provide a method for signaling transmit power information of a channel available to an unlicensed device that operates in the whitespace.

Objects of the present invention are not limited to those described above and other objects will be clearly understood by a person having ordinary knowledge in the art from the following description.

Technical Solution

A method for transmitting maximum transmit power information in a wireless communication system according to an embodiment of the present invention to achieve the above objects may include generating a frame including an operating class field, a channel number field of each of one or more channels, and a maximum transmit power level field applied to each of the one or more channels and transmitting the generated frame.

A method for receiving maximum transmit power information in a wireless communication system according to another embodiment of the present invention to achieve the above objects may include receiving a frame including an operating class field, a channel number field of each of one or more channels, and a maximum transmit power level field applied to each of the one or more channels and performing communication through a channel corresponding to the channel number field using a transmit power corresponding to the maximum transmit power level field.

An apparatus for transmitting maximum transmit power information in a wireless communication system according to another embodiment of the present invention to achieve the above objects may include a transceiver for transmitting a signal to a station (STA) and receiving a signal from the STA and a processor for controlling the apparatus including the transceiver. Here, the processor may be configured to generate a frame including an operating class field, a channel number field of each of one or more channels, and a maximum transmit power level field applied to each of the one or more channels and to transmit the generated frame through the transceiver.

An apparatus for receiving maximum transmit power information in a wireless communication system according to another embodiment of the present invention to achieve the above objects may include a transceiver for transmitting a signal to a station (STA) and receiving a signal from the STA and a processor for controlling the apparatus including the transceiver. Here, the processor may be configured to receive a frame including an operating class field, a channel number field of each of one or more channels, and a maximum transmit power level field applied to each of the one or more channels through the transceiver and to perform communication through a channel corresponding to the channel number field using a transmit power corresponding to the maximum transmit power level field.

The following features may be commonly applied to the embodiments of the present invention.

The one or more channels may constitute one or more channel groups, each of the one or more channel groups may include a plurality of individual channels, and at least a part of the plurality of individual channels may be non-contiguous in a frequency domain.

The frame may further include a channel group identifier field.

The maximum transmit power field may have the same value for individual channels belonging to the same channel group or may have an independent value for each individual channel.

The frame may further include a number of channels field.

The frame may have a value indicating the number of individual channels included in a channel group.

The operating class field may be included, as a field commonly applied to a plurality of channels, in the frame or may be included, as a field applied to each of the one or more channels, in the frame.

The frame may include a first triple including a channel power identifier field, the operating class field, and a coverage class field and a second triple including the channel group identifier field, the channel number field, and the maximum transmit power level field, the channel power identifier may have a value of 202 as an identifier of the first triple, and the second triple may be repeated the same number of times as the number of the channels.

The frame may include a first triple including a channel power identifier field, a number of channels field, and a coverage class field and a second triple including the operating class field, the channel number field, and the maximum transmit power level field, the channel power identifier may have a value of 202 as an identifier of the first triple, and the second triple may be repeated the same number of times as the number of the channels.

The frame may include a triple including the channel number field and the maximum transmit power level field, the channel power identifier may be an identifier of a channel group and have a value of one of 202 to 255, and the triple may be repeated the same number of times as the number of the channels.

The frame may include a first triple including a channel power identifier field, the operating class field, and a coverage class field and a second triple including the channel power identifier field, the channel number field, and the maximum transmit power level field, the channel power identifier may be an identifier of a channel group and has a value of one of 202 to 255, and the first and second triples may be repeated the same number of times as the number of the channels.

It is to be understood that both the foregoing general description and the following detailed description of the present invention are exemplary and explanatory and are intended to provide further explanation of the invention as claimed.

Advantageous Effects

According to the present invention, it is possible to provide a method and apparatus for signaling transmit power information of a channel available to an unlicensed device that operates in the whitespace.

Advantages of the present invention are not limited to those described above and other advantages will be clearly understood by a person having ordinary knowledge in the art from the following description.

DESCRIPTION OF DRAWINGS

The drawings, which are attached to this specification to provide a further understanding of the invention, illustrate various embodiments of the invention and together with the description serve to explain the principle of the invention. In the drawings:

FIG. 6 illustrates various examples of channel bandwidth allocation to a whitespace device.

FIG. 9 illustrates exemplary formats of a power constraint information element.

FIG. 10 illustrates a format of an extended transmit power constraint information element.

FIGS. 11 and 12 exemplarily illustrate a format of a country information element.

FIG. 14 exemplarily illustrates a format of a channel power information element to which the present invention is applied.

BEST MODEL

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or shown in block diagram form, focusing on important features of the structures and devices, so as not to obscure the concept of the present invention. The same reference numbers will be used throughout this specification to refer to the same or like parts.

First, a general configuration of a wireless LAN system is described below with reference to FIGS. 1 and 2.

Figure 1:
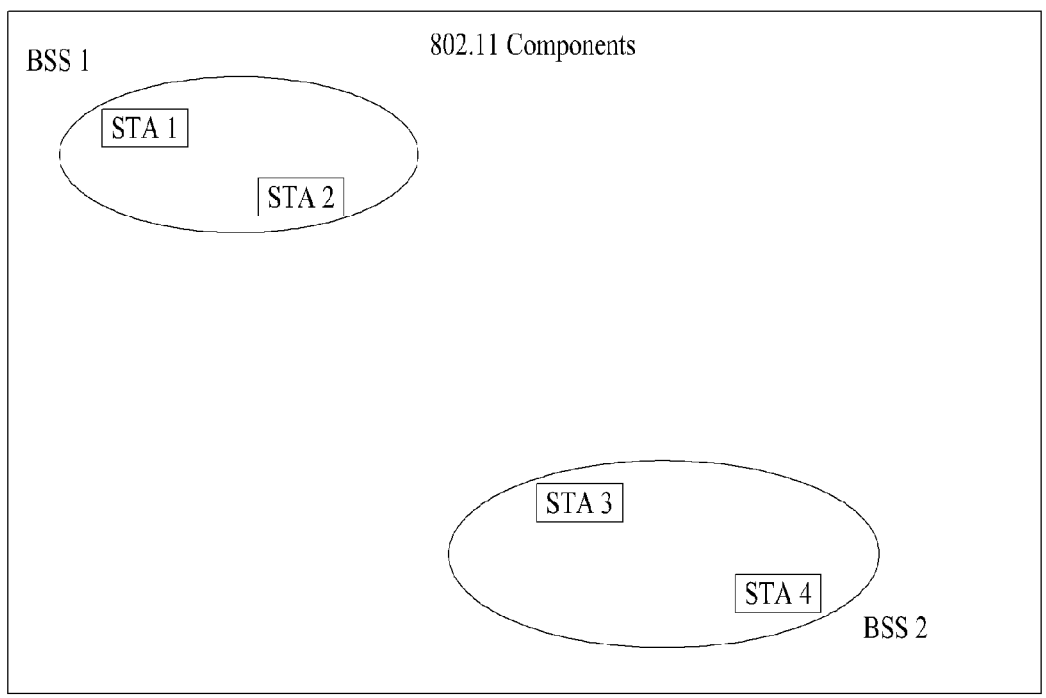
FIG. 1 illustrates an exemplary configuration of a wireless LAN system.

FIG. 1 illustrates an exemplary configuration of a wireless LAN system.

As shown in FIG. 1, the wireless LAN system includes one or more Basic Service Sets (BSSs). A BSS is a set of Stations (STAs) which can communicate with each other after successfully achieving synchronization.

The STA is a logical entity that includes an interface for a physical layer of a wireless medium and a Medium Access Control (MAC) layer. STAs include access point (AP) and non-AP stations. Among STAs, a mobile terminal that is operated by a user may be a non-AP STA. When the term "STA" is stated, it may refer to a non-AP STA. The non-AP STA may also be referred to as another term such as a terminal, a Wireless Transmit/Receive Unit (WTRU), a User Equipment (UE), a Mobile Station (MS), a mobile terminal, or a mobile subscriber unit.

The AP is an entity that provides an associated station (STA), which is coupled to the AP, with a connection to a Distribution System (DS) through a wireless medium. The AP may also be referred to as a concentrated controller, a Base Station (BS), a Node-B, a Base Transceiver System (BTS), or a site controller.

The BSS may be classified into an infrastructure BSS and an independent BSS (IBSS).

Each BSS shown in FIG. 1 is an IBSS. The IBSS is a BSS that does not include an AP. Since the IBSS does not include an AP, the IBSS is not allowed to connect to a DS and thus forms a self-contained network.

Figure 2:
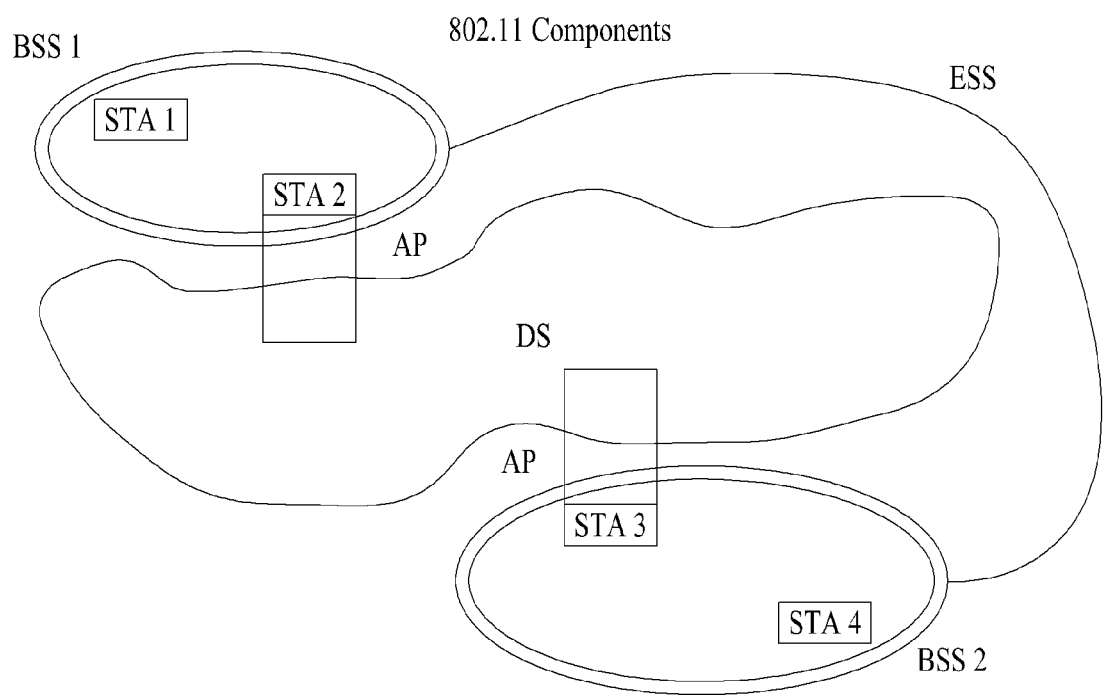
FIG. 2 illustrates another exemplary configuration of the wireless LAN system.

FIG. 2 illustrates another exemplary configuration of the wireless LAN system.

Each BSS shown in FIG. 2 is an infrastructure BSS. The infrastructure BSS includes one or more STAs and an AP. In the infrastructure BSS, in principle, communication between non-AP STAs is performed via an AP. However, when a direct link has been established between non-AP STAs, direction communication can be performed between the non-AP STAs.

As shown in FIG. 2, a plurality of infrastructure BSSs can be connected to each other through a DS. A plurality of BSSs connected through a DS is referred to as an Extended Service Set (ESS). STAs included in the ESS can communicate with each other. In the same ESS, a non-AP STA can move from one BSS to another BSS while performing seamless communication.

The DS is a mechanism which connects a plurality of APs. The DS is not necessarily a network and there is no limitation to the form of the DS provided that the DS can provide a specific distribution service. For example, the DS may be a wireless network such as a mesh network and may also be a physical structure that connects APs to each other.

A spectrum which is not used by licensed devices is referred to as a whitespace. The whitespace spectrum can be used by unlicensed devices. To allow an STA to operate in the whitespace spectrum, first, there is a need to provide a protection scheme for licensed devices (or incumbent users). A channel, which can be used by an unlicensed device since the channel is not used by any licensed device, is referred to as an available channel. The most basic methods for an STA or AP to determine availability of a TV channel include a spectrum sensing method and a method of connecting to a database (DB) to acquire a TV channel. Information of the DB includes information regarding, for example, a schedule for use of a specific channel by a licensed device at a specific location. Accordingly, when an STA or AP desires to determine availability of a TV channel, the STA or AP needs to connect to the DB through the Internet to acquire DB information based on location information of the STA or AP.

To connect to a network, the STA needs to search for any network in which the STA can participate. The STA needs to identify a compatible wireless network before participating in the network. A procedure for identifying a network present in a specific region is referred to as scanning.

Such scanning is classified into active scanning and passive scanning.

Figure 3:
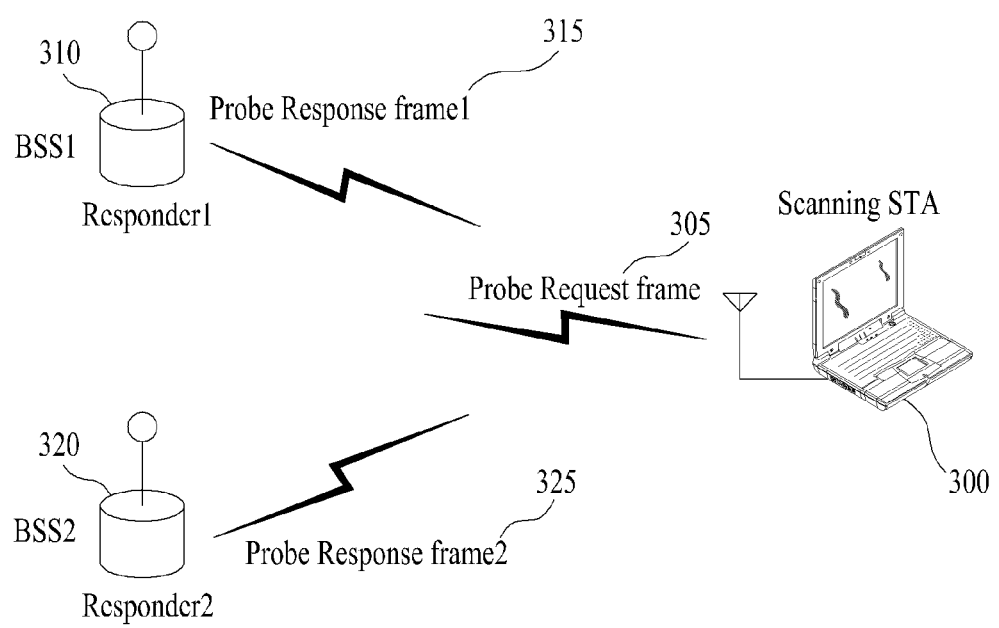
FIG. 3 schematically illustrates active scanning.

FIG. 3 schematically illustrates active scanning.

When an STA performs scanning using the active scanning scheme, the STA transmits a probe request frame in order to search for an AP around the STA while switching between channels and then awaits a response to the probe request frame. The responder transmits a probe response frame to the STA in response to the probe request frame transmitted from the STA. Here, the responder is an STA which has last transmitted a beacon frame in a BSS of a channel which is being scanned. In the infrastructure BSS, an AP serves as the responder since the AP transmits a beacon frame and, in the IBSS, the responder is not fixed since STAs in the IBSS take turns transmitting a beacon frame.

Referring to FIG. 3, when a scanning STA 300 transmits a probe request frame 305, responder 1 (310) of BSS1 and responder 2 (320) of BSS2, which have received the probe request frame, transmit probe response frame 1 (315) and probe response frame 2 (325) to the scanning STA 300. Upon receiving the probe response frame, the scanning STA 300 stores BSS related information included in the received probe response frame and shifts to a next channel and performs scanning of the next channel using the same method.

Figure 4:
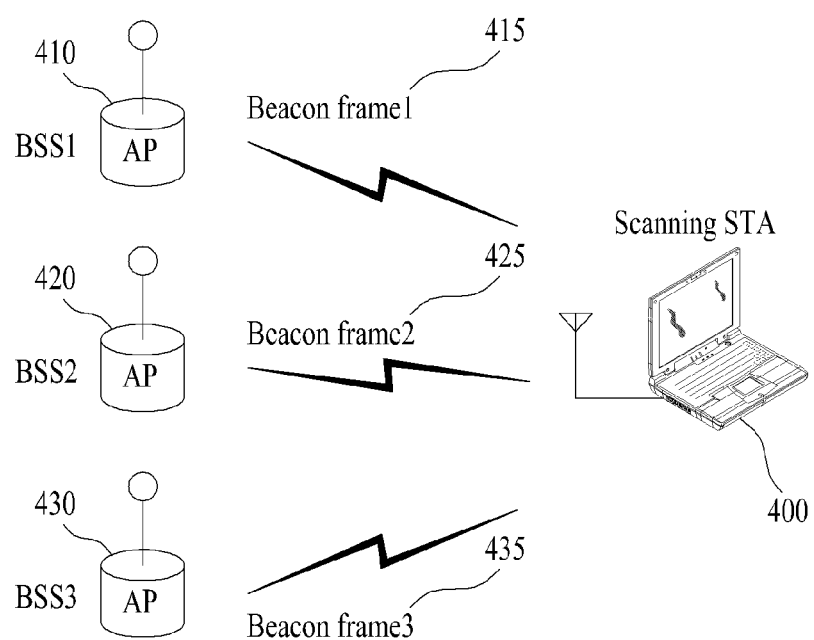
FIG. 4 schematically illustrates passive scanning.

FIG. 4 schematically illustrates passive scanning.

When an STA performs scanning using the passive scanning scheme, the STA awaits a beacon frame while switching between channels. The beacon frame, which is one of the management frames in IEEE 802.11, indicates presence of a wireless network and is transmitted at regular intervals to allow an STA which performs scanning to locate a wireless network to participate in the wireless network. In the infrastructure BSS, the AP serves to transmit the beacon frame at regular intervals.

When the STA that performs scanning has received a beacon frame, the STA stores BSS related information in the beacon frame and records beacon frame information in each channel while switching between channels.

In the example of FIG. 4, when a scanning STA 500, which is performing scanning using the passive scanning scheme, has received beacon frame 1 (415) transmitted by AP1 (410) of BSS1 and beacon frame 2 (425) transmitted by AP2 (420) of BSS2 and has not received beacon frame 3 (435) transmitted by AP3 (430) of BSS3, the scanning STA 500 stores information indicating that the two BSSs (BSS1 and BSS2) have been found in the measurement channel and shifts to another channel.

Compared to passive scanning, active scanning has an advantage in that delay and power consumption are low.

The following is a description of a procedure for enabling an STA for operation in a whitespace band.

An unlicensed device which operates in a whitespace band may be classified into an enabling STA and a dependent STA. The enabling STA is an STA which can enable the dependent STA. Even when the enabling STA has not received an enabling signal, the enabling STA can transmit a signal and can initiate the network.

The enabling STA may provide geo-location information to a database (DB) and acquire information regarding channels available at a corresponding geo-location from the DB. The enabling STA is not necessarily a WLAN STA and may be a logical entity or a network server that can provide enabling-related services.

The dependent STA is an STA which can transmit a signal only when the dependent STA has received an enabling signal. The dependent STA is controlled by the enabling STA. The dependent STA should be enabled through the enabling STA and cannot be enabled independently.

Figure 5:
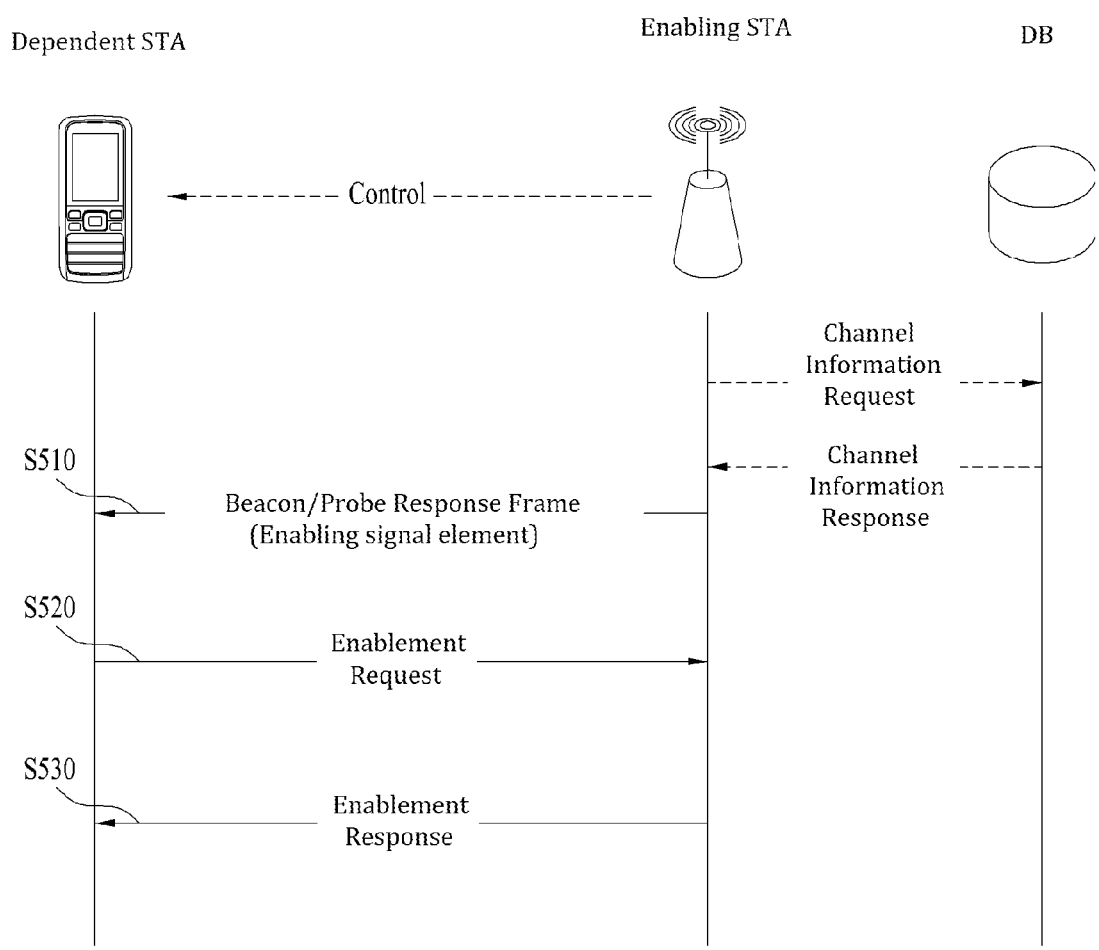
FIG. 5 illustrates a procedure for enabling an STA.

FIG. 5 illustrates an exemplary STA enablement procedure.

IEEE 802.11y is a standard designed for operation of unlicensed devices in a band of 3.5 GHz. The standard describes an enabling procedure which is referred to as Dynamic STA Enablement (DSE). The procedure in which a dependent STA is enabled by an enabling STA may be performed in a manner similar to the DSE procedure of IEEE 802.11y. Actually, an enabling procedure applied to whitespace may not necessarily be the same as the DSE procedure although the dependent STA is basically similar to the DSE procedure in that the dependent STA can transmit a signal through the corresponding band/channel only after the dependent STA has received an enabling signal.

As shown in FIG. 5, the enabling STA may transmit a probe response frame or a beacon including an enabling signal to the dependent STA (S510). The enabling signal is a signal indicating that enabling is possible. In the example of FIG. 5, a beacon or a probe response frame including an enabling signal element serves as an enabling signal. The dependent STA, which has received and decoded the enabling signal, transmits an enablement request frame to the enabling STA using a channel in which the enabling signal has been received (S520) and receives an enablement response frame from the enabling STA (S530).

Configuration of Available Channel Information

In order for an unlicensed device which is not an incumbent user to operate in the whitespace, the unlicensed device may acquire information (i.e., available channel information) regarding channels which do not cause interference to the incumbent user at a specific location and may operate according to the available channel information so as to protect the incumbent user. The available channel information may include an available channel list which is a set of one or more available channels.

The available channel information that the enabling STA acquires from the DB as described above and/or the available channel information (or the available channel list) that the dependent STA acquires from the enabling STA may be provided in the form of a White Space Map (WSM). The WSM may be transmitted and received between STAs as in the example of FIG. 5 or may be provided through a Channel Availability Query (CAQ) request/response.

Which channel can be used by an AP and/or STA that operates in the whitespace may be determined from the WSM. However, to allow the AP and/or STA to operate without causing interference to other users, there is a need to additionally determine the size of a channel bandwidth to be used or a transmit power limit value to be used according to the channel bandwidth. To accomplish this, the present invention suggests various methods for signaling a transmit power limit value according to the channel bandwidth of an unlicensed device (for example, AP and/or STA) which operates in the whitespace.

First, a configuration of a channel in the whitespace band is described below as an example. The following description is given with reference to the case in which the whitespace band is a TVWS band as an example. However, it should be noted that the scope of the present invention is not limited to operations associated with an unlicensed device in the TVWS and may be applied to operations associated with an unlicensed device in a general whitespace. The TVWS may include conventional VHF and UHF bands, devices such as an AP and an STA that operate in the TVWS (which are referred to as TV Band Devices (TVBDs)) may use about 30 channels, and the bandwidth of one channel may be basically in units of 6 MHz. To allow a TVDB to use a TVWS channel, it is required that no incumbent user be present in the channel. In addition, since the bandwidth of a channel used by the incumbent user is in units of 6 MHz, the bandwidth of a channel used by the TVDB needs to be equal to or less than 6 MHz. Here, since the IEEE 802.11a system supports a channel bandwidth of 5 MHz/10 MHz/20 MHz, 5 MHz may be used as a basic channel bandwidth in operation of the TVDB. The bandwidth of a channel which can be used by the TVDB may be 10 MHz or 20 MHz depending on the number of contiguous channels in which no incumbent user is present in the TVWS.

FIG. 6 illustrates various examples of channel bandwidth allocation in a whitespace band. Specifically, FIG. 6(a) illustrates examples in which a channel bandwidth includes contiguous channels and FIG. 6(b) illustrates examples in which a channel bandwidth includes non-contiguous channels. Channel allocation of FIG. 6 is merely exemplary and allocation of a channel bandwidth to an unlicensed device in the whitespace band may be performed in other manners.

A channel and a bandwidth that are used by an unlicensed device may be determined taking into consideration the following. When channels in which no incumbent user is present are contiguously present, it is generally advantageous that the unlicensed device uses a channel having a wider bandwidth. However, to increase a channel bandwidth for communication of an unlicensed device in the whitespace, it is necessary to additionally take into consideration Federal Communications Commission (FCC) regulations for adjacent channels. The FCC defines regulations that should be followed in communication in the whitespace band for network stability, security, or the like and a device that does not follow the FCC regulations should be prohibited from operating in the whitespace band. According to the FCC regulations, when a signal of an incumbent user is detected in a channel immediately adjacent to a channel which is currently used by an unlicensed device, the unlicensed device should reduce the transmit power of the currently used channel.

Figure 7:
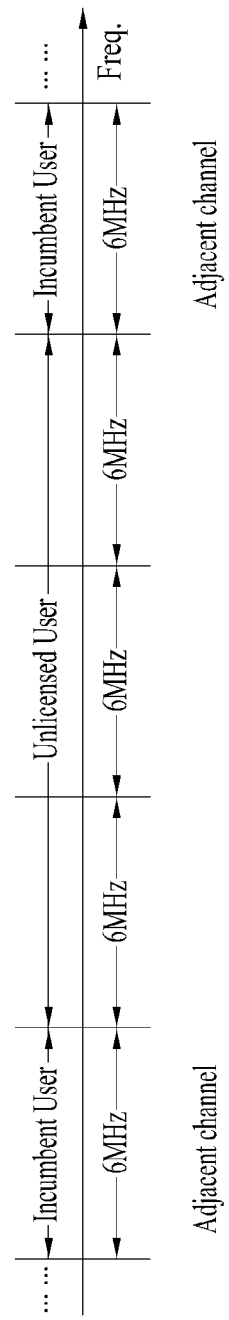
FIG. 7 illustrates an example of channel allocation in the whitespace.

FIG. 7 illustrates an example of channel allocation in a whitespace band. Here, the term channels adjacent to a channel refers to channels immediately adjacent to the channel at both ends of the channel (i.e., at the high and low frequency sides of the channel). In FIG. 7, adjacent channels are shown at both sides of a channel that is being used by an unlicensed device. The maximum transmit power level of the unlicensed device is about 100 mW only when no incumbent user is present in the channels adjacent to the channel used by the unlicensed device. However, the maximum transmit power level of the unlicensed device may be limited to 40 mW when an incumbent user is present in the channels adjacent to the channel used by the unlicensed device as shown in FIG. 7.

For example, the unlicensed device may use a band of 18 MHz (=6 MHz×3) when 3 contiguous whitespace channels are empty (i.e., no incumbent user is present in the 3 contiguous whitespace channels) as in the example of FIG. 3. When the 3 contiguous whitespace channels are empty, the unlicensed device can use a channel bandwidth of 10 MHz since the unlicensed device uses bandwidths of 5 MHz/10 MHz/20 Hz. The fact that the 3 contiguous whitespace channels are empty indicates that an incumbent user is present in channels at both sides of the 3 contiguous channels (i.e., an incumbent user is present in the adjacent channels of FIG. 7). In this case, if the unlicensed device performs communication of a bandwidth of 10 MHz using the 3 contiguous whitespace channels, the transmit power of the unlicensed device needs to be limited to 40 mW in order to protect the incumbent user at the adjacent channels. Even when the 3 contiguous whitespace channels are empty, 100 mW may be used as the maximum transmit power if the unlicensed device performs communication of a bandwidth of 5 MHz within the central whitespace channel among the 3 contiguous whitespace channels since no incumbent user is present in the adjacent channels.

Figure 8:
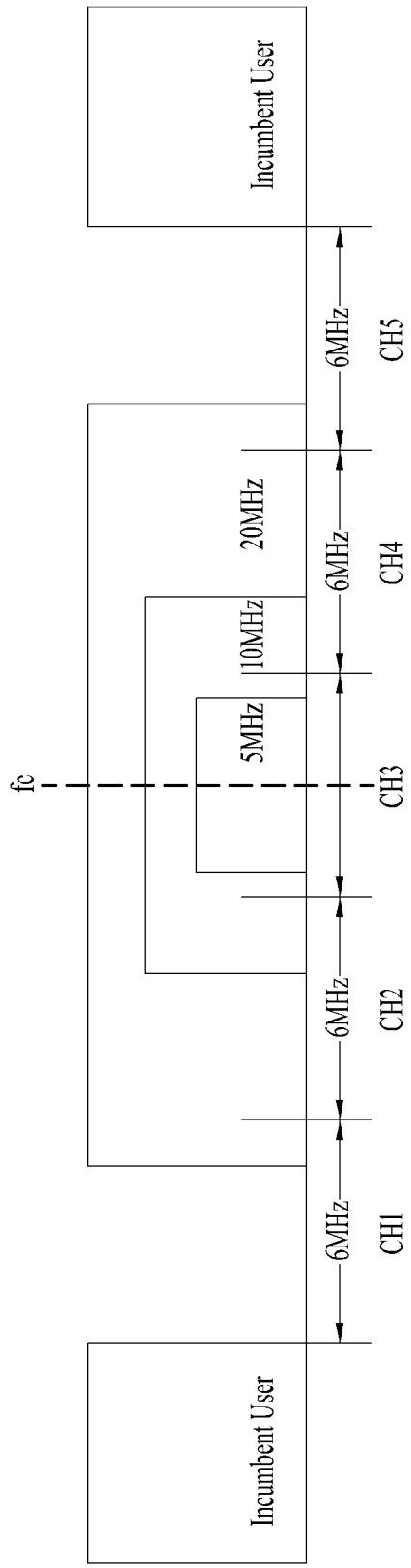
FIG. 8 illustrates another example of channel allocation in the whitespace.

FIG. 8 illustrates another example of channel allocation in the whitespace. Specifically, FIG. 8 illustrates an example in which a channel bandwidth of 5 MHz, 10 MHz, or 20 MHz is allocated to an unlicensed device when 5 whitespace channels are empty (i.e., when 5 whitespace channels are not used by any incumbent user). When the unlicensed device performs signal transmission using a bandwidth of 5 MHz, it is possible to perform transmission using high transmit power (for example, 100 mW) since only a part of CH3 is allocated to the unlicensed device and no incumbent user is present in the adjacent channels. In addition, when the unlicensed device performs signal transmission using a bandwidth of 10 MHz, it is possible to perform transmission using high transmit power (for example, 100 mW) since the entirety of CH3 and part of CH2 and CH4 are allocated to the unlicensed device and no incumbent user is present in the adjacent channels. However, when the unlicensed device performs signal transmission using a bandwidth of 20 MHz, the transmit power of the unlicensed device is limited to 40 mW since all of CH2, CH3, and CH4 and part of CH1 and CH5 are allocated to the unlicensed device and no incumbent user is present in channels adjacent to CH1 and CH5.

An environment in which it is advantageous that transmission is performed with a low power level using a wide bandwidth and an environment in which it is advantageous that transmission is performed with a high power level using a narrow bandwidth may be different as described above. Generally, it may be advantageous that a wider bandwidth is used for the unlicensed device since the amount of data that can be transmitted at a time increases the bandwidth increases. On the other hand, if the transmit power level is reduced, coverage may be reduced and a hidden node problem or the like may occur. The hidden node problem is the problem that a node (device) is invisible to other nodes (devices) that communicate with a wireless AP although the node is visible to the wireless AP. When a channel for operation of the unlicensed device is determined, whether or not an incumbent user is present in channels adjacent to the channel may vary according to the location and bandwidth of the channel and the transmit power of the unlicensed device may be limited accordingly and therefore there is a need to determine, taking into consideration such facts, the location and bandwidth of the channel which are advantageous for operation of the unlicensed device while reducing interference to an incumbent user.

The transmission band of an unlicensed device which operates in the whitespace (for example, an 802.11 AP and/or STA) may be set appropriately according to an environment. This may be referred to as a bandwidth adaptation mechanism. In the following description of the present invention, it is assumed that such adaptive bandwidth determination can be performed for an unlicensed device (AP and/or STA) which operates in the whitespace.

When such unlicensed device bandwidth allocation is performed, there is a need to appropriately set a maximum transmit power level for each allocated bandwidth. An extended power constraint information element may be defined in order to signal information regarding the maximum transmit power level for each channel bandwidth used by the unlicensed device.

FIG. 9 illustrates exemplary formats of a power constraint information element.

FIG. 9(a) illustrates an exemplary format of the power constraint information element. Similar to that defined in the IEEE 801.11 WLAN standard, the power constraint information element in the example of FIG. 9(a) may include an element ID field (having a length of 1 octet), a length field (having a length of 1 octet), and a local power constraint field (having a length of 1 octet). The element ID field may have a value corresponding to an identifier indicating that the information element is a power constraint information element. The length field may have a value indicating the length of fields after the length field and may be set to a value of 1 in this example. The local power constraint field may have a value indicating setting of transmit power applied to an STA. The embodiments of the present invention are described assuming that such values are expressed in units of dBm. The information element may be transmitted within a beacon frame, a probe response frame, or the like.

FIG. 9(b) illustrates an extended power constraint information element suggested in the present invention.

In the example of FIG. 9(b), an element ID field of the extended power constraint information element may have a value indicating that the information element is an extended power constraint information element and a length field may have a value of n. The value n may be set differently in various examples described below. The extended power constraint information element may include a channel power constraint field which may be repeated once or more. Using the information element as in the example of FIG. 9(b), a maximum transmit power level may be signaled according to a channel bandwidth. Such setting of different maximum transmit power according to the channel bandwidth includes two cases. The first is determination of the maximum transmit power level according to the size of the channel bandwidth and the other is determination of the maximum transmit power level according to channel number (i.e., the location of the channel).

FIG. 9(c) illustrates an exemplary detailed format of the channel power constraint field in the extended power constraint information element format of FIG. 9(b). In this example, the maximum transmit power level is determined according to the size of the channel bandwidth. The channel bandwidth field may have a value indicating the size of the channel bandwidth, i.e., a value of 5 MHz, 10 MHz, or 20 MHz and the local power constraint field may have a value indicating a maximum transmit power that is applied to the bandwidth size. For example, when a maximum transmit power limit value for each of 5 MHz, 10 MHz, and 20 MHz is signaled, the channel power constraint field in the extended power constraint information element format of FIG. 9(b) may be configured such that a pair of the channel bandwidth field and the local power constraint field of FIG. 9(c) is repeated 3 times.

When the maximum transmit power limit value is set according to the size of the bandwidth in such a manner, the same maximum transmit power may be set for all channels included in the bandwidth. For example, in the example of FIG. 8, the maximum transmit powers for CH2 to CH4 may all be set to 100 mW when a bandwidth of 10 MHz is allocated and the maximum transmit powers for CH1 to CH5 may all be set to 40 mW when a bandwidth of 20 MHz is allocated.

FIG. 9(d) illustrates an exemplary detailed format of the channel power constraint field in the extended power constraint information element format of FIG. 9(b). In this example, a maximum transmit power level is individually determined according to channel number. For example, when 5 channels are empty in the whitespace as in the example of FIG. 8, an AP that operates in the whitespace may set the maximum transmit power to 40 mW for each of CH1 and CH5 and may set the maximum transmit power to 100 mW for each of CH2, CH3, and CH4. In this case, the transmit power of an STA that operates in the whitespace may be limited to 40 mW when the STA performs transmission through CH1 and/or CH5 and the transmit power may be allowed up to 100 mW when the STA performs transmission through CH2 CH3, and/or CH4.

While one transmit power value is applied within the bandwidth used by the unlicensed device in the example of FIG. 9(c), an individual transmit power value may be applied for each channel regardless of the size of the bandwidth used by the unlicensed device in the example of FIG. 9(d). For example, when the unlicensed device uses a bandwidth of 20 MHz in the example of FIG. 8, the maximum transmit power may be set to 100 mW for each of CH2, CH3, and CH4 and the maximum transmit power may be set to 40 mW for CH1 and CH5.

The channel number in the example of FIG. 9(d) may indicate the number of a channel at which a center frequency of a specific channel is located. In this case, the channel number may indicate the location of the center frequency of a bandwidth having a specific size. For example, "CH3" in the example of FIG. 8 may indicate that the center frequency of a channel having a bandwidth of 5 MHz is located at CH3 or may indicate a bandwidth of 10 MHz whose center frequency is located at CH3. Accordingly, to correctly apply transmit power constraints, there is a need to signal information regarding the size of the channel bandwidth together with the channel number (i.e., the location of the center frequency). Examples of a detailed configuration of the channel power constraint field in the extended transmit power constraint information element in this case are described below with reference to FIG. 10.

FIG. 10(a) illustrates an exemplary detailed format of the channel power constraint field in the extended power constraint information element format of FIG. 9(b). In this example, the maximum transmit power level is determined according to the channel number (i.e., the location of the center frequency) and the channel bandwidth. In FIG. 10(a), a channel number field indicates the location of a center frequency of a channel bandwidth to which a transmit power limit value is applied. The channel number field in this specification corresponds to identifier information for discriminating one channel from other channels (i.e., an identifier indicating a channel as a minimum unit as denoted by CH1, CH2, CH3, CH4, or CH5 in the example of FIG. 8) and is different from a number of channels field which indicates the number of channels as described below. A channel bandwidth field indicates the size of the bandwidth and a local power constraint field indicates a transmit power limit value applied in a frequency region which is specified by the location of the center frequency and the size of the bandwidth.

FIG. 10(b) illustrates a modified example of FIG. 10(a) for the case in which non-contiguous channels are allocated to an unlicensed device. For example, when a channel of 20 MHz is configured, the channel may consist of 2 non-contiguous segments, each having a bandwidth size of 10 MHz. In this case, for each of the segments, there is a need to signal a channel number (the location of the center frequency) and a bandwidth size information together with a transmit power limit value. When a channel bandwidth allocated to an unlicensed device consists of 2 segments, the 3 fields of FIG. 10(b) may be repeated the same number of times (i.e., twice) as the number of segments.

FIG. 10(c) illustrates a modified example of FIG. 10(a) for the case in which non-contiguous channels are allocated to an unlicensed device and each segment has the same bandwidth. In this case, a channel bandwidth field does not need to be repeated and may be interpreted as a value commonly applied to all segments. That is, since it is only necessary to signal a channel number (i.e., the location of the center frequency) and a maximum transmit power value for each segment, only the channel number field and the local power constraint field may be repeated the same number of times as the number of segments as shown in FIG. 10(c).

FIG. 10(d) illustrates a modified example of FIG. 10(a) for the case in which non-contiguous channels are allocated to an unlicensed device and each segment has the same bandwidth and the same transmit power limit value. In this case, the channel bandwidth field and the local power constraint field do not need to be repeated and may be interpreted as a value commonly applied to all segments. That is, since it is only necessary to signal the channel number (i.e., the location of the center frequency) for each segment, only the channel number field may be repeated the same number of times as the number of segments as shown in FIG. 10(d).

Method of Signaling Maximum Transmit Power Information

As described above, a maximum transmit power limit value in a channel bandwidth allocated to an unlicensed device in the whitespace may be signaled taking into consideration the location or size of the channel bandwidth allocated to the unlicensed device, presence or absence of an incumbent user in adjacent channels, or the like. Such a maximum transmit power signaling method may be applied when an unlicensed device operates in one country. However, regulations on the maximum allowable transmit power are applied differently to each country. Accordingly, there is a need to signal the maximum allowable transmit power for each country.

FIG. 11 exemplarily illustrates a format of a country information element. The country information element is an information element including information items required for an STA to identify regulatory domain at which the STA is located and to perform setting for operation in the regulatory domain. Here, the information element may correspond to components of a management frame body. A general MAC frame format may include a frame header, a frame body, and a Frame Check Sequence (FCS).

In the example of FIG. 11, an Element ID field may have a value corresponding to an identifier indicating that the information element is a country information element. The Length field may have a value indicating the length of fields after the Length field. The Country String field, which indicates the country, is set to a value included in a dot11CountryString attribute and has a length of 3 octets. The Country Field Triplets field has a length of a multiple of 3 octets (i.e., a 3-octet field may be repeated once or more) and details of the Country Field Triplets field are described below with reference to Table 1. The term "triplet" or "triple" in this specification has the same meaning and indicates a single unit that consists of a group of 3 octets. A Pad field has a length of 0 or 1 octet. Since the length of the country information element should be divided by 2, a Pad field may be used to add a length of 1 octet if the length before the Pad field has a length of odd octets. The value of the Pad field is 0.

The following Table 1 illustrates a configuration of a Country Field Triplets field.

TABLE 1

| Name | 1st Octet | 2nd Octet | 3rd Octet |
|---|---|---|---|
| Operating Triple | Operating Extension Identifier (201) | Operating Class | Coverage Class |
| Sub-band Triple | First Channel Number | Number of Channels | Maximum Transmit Power Level |

The first octet of the Country Field Triplets field includes a First Channel Number/Operating Extension Identifier field. That is, when the value of the first octet (First Channel Number/Operating Extension Identifier field) is 201, the Country Field Triplets field includes an Operation Extension Identifier field, an Operating Class field, and a Coverage Class field and these 3 fields may be collectively referred to as an operating triple. When the value of the first octet (First Channel Number/Operating Extension Identifier field) is not 201, the Country Field Triplets field includes a First Channel Number field, a Number of Channels field, and a Maximum Transmit Power Level field and these 3 fields may be collectively referred to as a sub-band triple.

The first octet of the operating triple corresponds to an identifier indicating that the triple is an operating triple and the second and third octets correspond respectively to the Operating Class field and the Coverage Class field.

The Operating Class field serves as an index indicating one of a plurality of sets of rules (or regulations) established to be applied to wireless devices. For example, one set of rules may include a channel starting frequency, a channel spacing, a channel set, and a behavior limit set (or an operation limit set). That is, the Operating Class field may indicate a predetermined group of channels, each of which is defined by a specific frequency, a bandwidth, and a channel number. Simply stated, the Operating Class field may be considered a group of channels specified according to a predetermined rule. For example, in the case of United States, the Operating Class field may be determined as shown in the following Table 2.

TABLE 2

| Operating class | Global operating class (see Table E-4 (Global operating classes)) | Channel starting frequency (GHz) | Channel spacing (MHz) | Channel set | Behavior limits set |
|---|---|---|---|---|---|
| 1 | 115 | 5 | 20 | 36, 40, 44, 48 | NomadicBehavior |
| 2 | 118 | 5 | 20 | 52, 56, 60, 64 | NomadicBehavior |
| 3 | 124 | 5 | 20 | 149, 153, 157, 161 | NomadicBehavior |
| 4 | 121 | 5 | 20 | 100, 104, 108, 112, 116, 120, 124, 128, 132, 136, 140 | NomadicBehavior |
| 5 | 125 | 5 | 20 | 149, 153, 157, 161, 165 | LicenseExemptBehavior |
| . | . | . | . | . | . |
| . | . | . | . | . | . |
| . | . | . | . | . | . |
| 31 | 127 | 5 | 40 | 153, 161 | LicenseExemptBehavior, PrimaryChannelUpperBehavior |
| 32 | 83 | 2.407 | 40 | 1-7 | LicenseExemptBehavior, PrimaryChannelLowerBehavior |
| 33 | 84 | 2.407 | 40 | 5-11 | LicenseExemptBehavior, PrimaryChannelUpperBehavior |
| 34-255 | Reserved | Reserved | Reserved | Reserved | Reserved |

Next, the Coverage Class field serves as an index indicating a value associated with an air propagation time.

The first octet of the sub-band triple corresponds to a First Channel Number field, the second octet corresponds to a Number of Channels field, and the third octet corresponds to a maximum transmit power level. That is, a maximum transmit power level associated with a specific channel may be signaled through the sub-band triple. Here, a channel to which the maximum transmit power level is applied is specified only by information (First Channel Number field) regarding the starting point and information (Number of Channels field) regarding the number of included channels. That is, the same maximum transmit power level may be set in units of contiguous channels.

For example, a Country Field Triplets field of FIG. 11 may include a sub-band triple subsequent to an operating triple (N=2 in FIG. 11 in this case). Accordingly, information regarding an operating class of a wireless device (which includes information regarding a channel set) is provided through the operating triple and the maximum transmit power level of contiguous channels may be signaled through the sub-band triple.

FIG. 12 illustrates the configuration of the Country Field Triplets field of FIG. 11, which is described above with reference to Table 1, together with the remaining fields of the country information element.

In the case in which contiguous channels are allocated to an unlicensed device, it may be appropriate that the maximum transmit power level of the channels is signaled using the country information element as shown in FIG. 11 or FIG. 12. However, the country information element as shown in FIG. 11 or FIG. 12 may be inappropriate to signal the maximum transmit power level of non-contiguous channels. For example, in the case in which the maximum transmit power level of non-contiguous channels is signaled using the country information element, information defining an operating class, a channel set, or the like of each non-contiguous channel needs to be signaled to signal the maximum transmit power level for the channel set of the operating class. For example, in the case in which 10 channels are present and the channels are grouped into pairs of channels, each constituting a single non-contiguous channel, the number of all possible combinations thereof is 36. Accordingly, to signal the maximum transmit power level of a non-contiguous channel using a conventional country information element, it is necessary to predefine operating classes and channel sets corresponding to all possible configurations of a non-contiguous channel such that it is possible to signal the maximum transmit power level of a specific one of the predefined channel sets.

In the case of non-contiguous channels, predefining all configurable channel sets in the form of a table as described above may waste resources or may be impossible when available resources are restricted since the number of possible configurations is too great. Even when operating classes and channel sets corresponding to all possible configurations are predefined in the case of non-contiguous channels, indexing a specific operating class and a specific channel set among the predefined operating classes and channel sets may significantly increase signaling overhead. Accordingly, there is a need to provide a method of efficiently and correctly signaling the maximum transmit power level even for the case of the non-contiguous channel configuration. To accomplish this, the present invention suggests a new format for signaling the maximum allowable transmit power for various cases including a non-contiguous channel configuration. Various examples of the method of the present invention are described below.

The following Table 3 illustrates a new country field triples format according to an embodiment of the present invention.

TABLE 3

| Name | 1st Octet | 2nd Octet | 3rd Octet |
| --- | --- | --- | --- |
| Channel Power Triple | Channel Power Identifier (202) | Operating Class | Coverage Class |
| Sub-channel Triple | Channel Index | Channel Number | Maximum Transmit Power Level |
| Operating Triple | Operating Extension Identifier (201) | Operating Class | Coverage Class |
| Sub-band Triple | First Channel Number | Number of Channels | Maximum Transmit Power Level |

Unlike the country field triples (see Table 1), the present invention newly defines a channel power triple and a sub-channel triple. A country information element which includes only a conventional operating triple and a conventional sub-band triple is inefficient for channels which are non-contiguously configured although the country information element is sufficient to signal the maximum allowable transmit power of contiguous channels. Using a channel power triple and a sub-channel triple suggested in the present invention, it is possible to efficiently signal the maximum allowable transmit power even for non-contiguous channels.

In the example of Table 3, the channel power triple may be used to indicate that the channel to which the maximum allowable transmit power is applied is a non-contiguous channel when the maximum allowable transmit power is signaled through a country information element. A sub-channel triple may be added subsequent to the channel power triple and may be used to indicate the maximum allowable transmit power level for a non-contiguous channel.

Specifically, whether or not the Country Field Triplets field (see FIG. 11) is a channel power triple may be indicated using the value of a Channel Power Identifier field which is the first octet. For example, as shown in Table 3, when the value of the Channel Power Identifier field is 202, this may indicate that the Country Field Triplets field is a channel power triple. The second octet of the channel power triple is an Operating Class field and the third octet is a Coverage Class field. The Operating Class and Coverage Class fields of the channel power triple correspond to an operating class and a coverage class belonging to channels indicated by a sub-channel triple subsequent to the channel power triple. Through the channel power triple defined as described above, it is possible to indicate an operating class or the like to which channels to which the subsequent sub-channel triple is applied belong (where channels to which the sub-channel triple is applied may be all or part of the channels corresponding to the operating class of the channel power triple) and it is possible to indicate that non-contiguous channels have been configured. A sub-band triple cannot follow the channel power triple but instead a sub-channel triple may follow the channel power triple.

Figure 13:
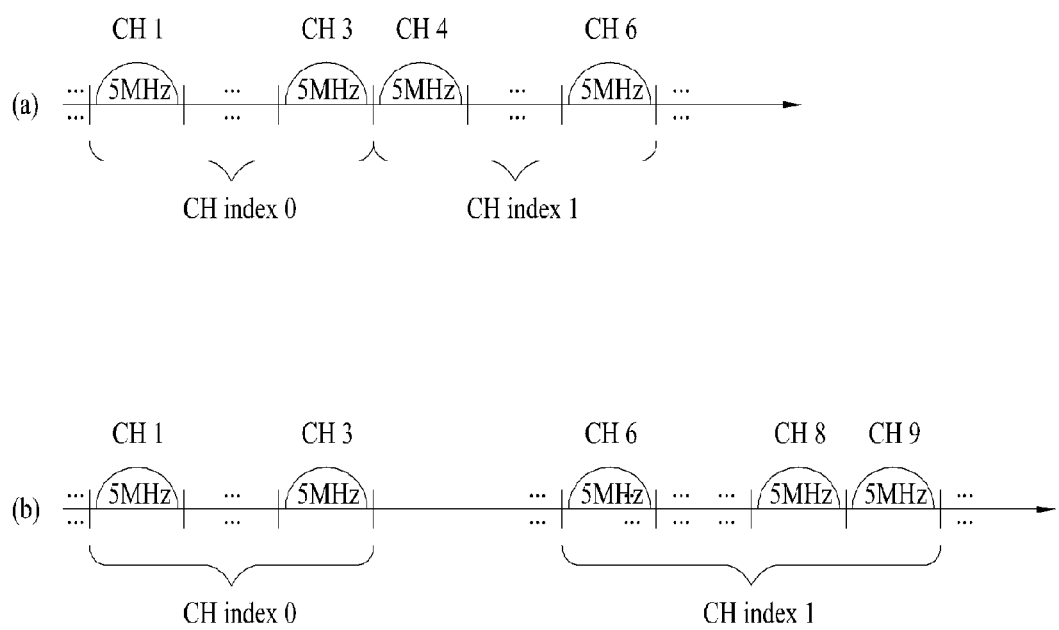
FIG. 13 illustrates examples of a non-contiguous channel configuration.

The sub-channel triple includes a Channel Index field, a Channel Number field, and a Maximum Transmit Power Level field. The Channel Index field may be used as a value identifying a single non-contiguous channel to which the sub-channel triple is applied. Here, the non-contiguous channel includes channels which are not adjacent to each other and the term "channels" refers to minimum units that are identified as respective channel numbers. FIG. 13 illustrates examples of a non-contiguous channel configuration. In the examples of FIG. 13, one channel index (CH index) is assigned to one non-contiguous channel (which is a unit including channels which are not adjacent to each other). In the example of FIG. 13(a), a non-contiguous channel which is assigned CH index 0 includes channels CH1 and CH3 and a non-contiguous channel of CH index 1 includes channels CH4 and CH6. In the example of FIG. 13(b), one non-contiguous channel includes channels which are not adjacent to each other and channels which are adjacent to each other. That is, the example of FIG. 13(b), a non-contiguous channel of CH index 0 includes channels CH1 and CH3 and a non-contiguous channel of CH index 1 includes channels CH6, CH8, and CH9. Thus, one non-contiguous channel may be considered a unit indicating one channel group including channels which are not adjacent to each other. A single non-contiguous channel unit may be identical to an available channel unit which can be allocated to an STA. From the viewpoint of this, individual channels belonging to one non-contiguous channel may be expressed as being bonded to each other. Here, it is to be noted that the channel indices and channel numbers of FIG. 13 are merely exemplary and a non-contiguous channel may be configured in various forms.

As described above, the Channel Index field in the sub-channel triple indicates one non-contiguous channel and, when 2 channels constitute a single non-contiguous channel, respective channel index values in the sub-channel triple for the 2 channels need to be the same. When the channel index values of the sub-channel triple are different, this indicates that the sub-channel triple is associated with different non-contiguous channels. In the example of FIG. 13(a), channels CH1 and CH3 constitute one non-contiguous channel and, when the channel index value is 0, this indicates that the sub-channel triple is associated with channels of channel index 0.

Next, a Channel Number field which is the second octet of the sub-channel triple indicates a number of each channel (which is a minimum unit as a component of a non-contiguous channel). In addition, a Maximum Transmit Power Level field which is the third octet of the sub-channel triple indicates a maximum allowable transmit power value of the channel.

The following Table 4 illustrates an exemplary channel power triple and an exemplary sub-channel triple when a maximum allowable transmit power of a non-contiguous channel among channels belonging to a channel group corresponding to coverage class #0 and operating class #0 is signaled in the case in which a country information element, which is newly defined in the present invention as shown in Table 3, is used.

TABLE 4

| 1st Octet | 2nd Octet | 3rd Octet |
|---|---|---|
| Channel Power Identifier (202) | 0 | 0 |
| 0 | 1 | 100 mW |
| 0 | 3 | 100 mW |
| 1 | 4 | 40 mW |
| 1 | 6 | 40 mW |

In the example of Table 4, 3 octets are repeated a total of 5 times. Specifically, the first row of Table 4 corresponds to a channel power triple and the second to fifth rows indicate that a sub-channel triple is included four times. An operating triple and a sub-band triple may be included after the last sub-channel triple in Table 4 although not shown in Table 4.

In the example of Table 4, the first octet (channel power identifier) of the channel power triple has a value of 202 to identify the triple as a channel power triple and the second and third octets may be used to indicate that the operating class and the coverage class are operating class 0 and coverage class 0. Table 4 shows an example in which 4 sub-channel triples are included after the channel power triple and information regarding the maximum allowable transmit power applied to 2 non-contiguous channels is signaled through the sub-channel triple.

Table 4 also shows exemplary signaling of the maximum allowable transmit power for the case in which the first non-contiguous channel includes channels 1 and 3 (CH1 and CH3) and the second non-contiguous channel includes channels 4 and 6 (CH4 and CH6) as in the example of FIG. 13(a). That is, in the case in which a sub-channel triple is configured as shown in Table 4, it is possible to signal that the channels CH1 and CH3 belong to one non-contiguous channel (i.e., CH index 0) and the channels CH4 and CH6 belong to the other non-contiguous channel (i.e., CH index 1) without additional signaling of the non-contiguous channel configuration.

In the example of Table 4, a maximum transmit power of 100 mW is commonly signaled for CH index 0 (CH1 and CH3) and a maximum transmit power of 40 mW is commonly signaled for CH index 1 (CH4 and CH6). That is, a maximum transmit power may be signaled for each non-contiguous channel (or for each channel index). However, the present invention is not limited to this example and a maximum transmit power may be signaled for each channel (or for each channel number). That is, different maximum transmit powers may be signaled for channels (channel numbers) belonging to one non-contiguous channel (or one channel index).

Table 4 illustrates a new country field triples format according to another embodiment of the present invention.

TABLE 5

| Name | 1st Octet | 2nd Octet | 3rd Octet |
|---|---|---|---|
| Channel Power Triple | Channel Power Identifier (202) | Number of Channel | Coverage Class |
| Sub-channel Triple | Operating Class | Channel Number | Maximum Transmit Power Level |
| Operating Triple | Operating Extension Identifier (201) | Operating Class | Coverage Class |
| Sub-band Triple | First Channel Number | Number of Channels | Maximum Transmit Power Level |

According to the example of Table 5, a sub-channel triple may be added after a channel power triple to signal the maximum allowable transmit power of a non-contiguous channel. Unlike the example of Table 3, the example of Table 5 may also be applied to the case in which individual channels which are components of one non-contiguous channel belong to different operating classes. That is, while the example of Table 3 is limited to the case in which a non-contiguous channel is constructed of channels belonging to one operating class, the example of Table 5 can support the case in which one non-contiguous channel is constructed of a plurality of individual channels even when the operating classes of the individual channels are different.

First, when the value of the first octet (channel power identifier) is a specific value (for example, 202), this may identify the corresponding triple as a channel power triple. A Number of Channels field which is the second octet of the channel power triple indicates the number of individual channels which constitute one non-contiguous channel. For example, when the value of the Number of Channels field is N, N sub-channel triples subsequent to the channel power triple may signal maximum transmit power values of N individual channels belonging to one non-contiguous channel. A Coverage Class field which is the third octet of the channel power triple serves as an index indicating a set of values associated with air propagation time of the non-contiguous channel.

A sub-band triple cannot follow the channel power triple and a sub-channel triple may be repeated N times. The maximum allowable transmit powers of individual channels as components of one non-contiguous channel may be signaled through the N sub-channel triples.

As shown in Table 5, a sub-channel triple may include Operating Class, Channel Number, and Maximum Transmit Power Level fields. The Operating Class and Channel Number fields of the sub-channel triple indicate an operating class to which an individual channel as a component of one non-contiguous channel belongs and a channel number of the individual channel. The Maximum Transmit Power Level field of the sub-channel triple indicates the maximum allowable transmit power that is applied to the individual channel corresponding to the Channel Number field. Here, since the value of the Maximum Transmit Power Level field may be signaled for each individual channel, the same maximum transmit power or different maximum transmit powers may be given for N individual channels belonging to one non-contiguous channel.

In the example of Table 5, it is possible to consider the case in which a plurality of non-contiguous channels is present. For example, 1 first non-contiguous channel may be constructed of N individual channel(s) and a second non-contiguous channel may be constructed of K individual channel(s). In this case, sub-channel triple(s) corresponding to a value (for example, a value of N) of the Number of Channel field of the channel power triple may indicate the maximum allowable transmit power of individual channel(s) belonging to one non-contiguous channel (the first non-contiguous channel). In addition, sub-channel triple(s) present subsequent to the N sub-channel triple(s) may indicate the maximum allowable transmit power of the other non-contiguous channel (the second non-contiguous channel). Alternatively, one channel power triple (with a Number of Channel field having a value of N) and N subsequent sub-channel triple(s) may indicate the maximum allowable transmit power of individual channels belonging to the first non-contiguous channel and a new channel power triple (with a Number of Channel field having a value of K) and K subsequent sub-channel triple(s) may be included subsequently to indicate the maximum allowable transmit power of individual channels belonging to the second non-contiguous channel.

Table 6 illustrates a new country field triples format according to another embodiment of the present invention.

TABLE 6

| Name | 1$^{st}$ Octet | 2$^{nd}$ Octet | 3$^{rd}$ Octet |
| --- | --- | --- | --- |
| Operating Triple | Operating Extension Identifier (201) | Operating Class | Coverage Class |
| Sub-band Triple | Channel Power Identifier (202-255) | Channel Number | Maximum Transmit Power Level |
| Operating Triple | Operating Extension Identifier (201) | Operating Class | Coverage Class |
| Sub-band Triple | First Channel Number | Number of Channels | Maximum Transmit Power Level |

The example of Table 6 shows a method of signaling a maximum allowable transmit power value of a non-contiguous channel through modification of a conventional operating triple and a conventional sub-band triple (see Table 1) rather than defining a new channel power triple and a new sub-channel triple as in the example of Table 3. In other words, the example of Table 6 may be considered a method of selecting a channel index value from the range of 202 to 255 in the example of Table 3.

Specifically, in the example of Table 6, the operating triple may be configured equally to an operating triple of the conventional country field triples format (see Table 1). That is, the operating triple may include an operating extension identifier (having a value of 201) and Operating Class and Coverage Class fields.

A sub-band triple is included subsequent to the operating triple and it is possible to signal a maximum allowable transmit power of each individual channel through the sub-band triple. An operating class, to which an individual channel whose maximum transmit power is signaled through the sub-band triple belongs, and coverage class information of the individual channel are determined by an operating triple prior to the sub-band triple.

Here, whether the sub-band triple is associated with a contiguous channel or a non-contiguous channel may be determined according to a range to which the value of the first octet of the triple belongs. For example, whether the sub-band triple is associated with a contiguous channel or a non-contiguous channel may be determined such that, when the value of the first octet of the sub-band triple is within a range between 1 and 200, this indicates that the sub-band triple is associated with a contiguous channel and, when the value of the first octet is within a range between 202 and 255, this indicates that the sub-band triple is associated with a non-contiguous channel. Specifically, similar to the conventional sub-band triple, the sub-band triple corresponds to a First Channel Number field indicating information regarding the starting point of a contiguous channel when the first octet of the country field triple has a value of a positive integer less than 201 and corresponds to an operating triple when the first octet of the country field triple has a value of 201 or the sub-band triple corresponds to a Channel Power Identifier field, as in the example of Table 6, when the first octet of the country field triple has a value of a positive integer which is equal to or greater than 202 and is equal to or less than 255. That is, whether the sub-band triple is associated with a contiguous channel or a non-contiguous channel is determined through the value of the first octet (channel power identifier) of the sub-band triple.

In addition, when the Channel Power Identifier field of the sub-band triple has a value in a range between 202 and 255 (i.e., when the sub-band triple is associated with a non-contiguous channel), the sub-band triple may include Channel Power Identifier, Channel Number, and Maximum Transmit Power Level fields.

The Channel Power Identifier field of the sub-band triple may be used for a purpose similar to that of the Channel Index field of the sub-channel triple in the example of Table 3. That is, one channel power identifier value is assigned to one non-contiguous channel. In other words, sub-band triples whose Channel Power Identifier fields have the same value are associated with individual channels as components of the same non-contiguous channel.

The Channel Number field of the sub-band triple indicates a channel number of an individual channel. Here, the term "individual channel" refers to a minimum unit as a component of a non-contiguous channel. The Maximum Transmit Power level field of the sub-band triple indicates the maximum allowable transmit power of a non-contiguous channel. The maximum allowable transmit powers of individual channels which constitute a non-contiguous channel may be set to the same level or may be set to different levels to improve performance.

For example, let us assume in the example of FIG. 13(a) that the value of a Channel Power Identifier of one non-contiguous channel expressed as CH index 0 is 202. In this case, the 3 octets of the first sub-band triple in the example of Table 6 may have values corresponding to {202, CH1, 100 mW} and the 3 octets of the second sub-band triple may have values corresponding to {202, CH3, 40 mW}.

Table 7 illustrates a new country field triples format according to another embodiment of the present invention.

TABLE 7

| Name | 1st Octet | 2nd Octet | 3rd Octet |
|---|---|---|---|
| Operating Triple | Channel Power Identifier (202-255) | Operating Class | Coverage Class |
| Sub-band Triple | Channel Power Identifier (202-255) | Channel Number | Maximum Transmit Power Level |
| Operating Triple | Channel Power Identifier (202-255) | Operating Class | Coverage Class |
| Sub-band Triple | Channel Power Identifier (202-255) | Channel Number | Maximum Transmit Power Level |

Unlike the example of Table 6, the example of Table 7 may also be applied to the case in which individual channels which are components of one non-contiguous channel belong to different operating classes. That is, while the example of Table 6 is limited to the case in which a non-contiguous channel is constructed of channels belonging to one operating class, the example of Table 7 can support the case in which one non-contiguous channel is constructed of a plurality of individual channels even when the operating classes of the individual channels are different.

When the values of the operating classes to which the individual channels belonging to one non-contiguous channel are different, an operating triple and a sub-band triple may be repeated as in the example of Table 7.

While the first octet (operating extension identifier) of the conventional operating triple may have a value of 201 to identify the triple as an operating triple, the first octet of the operating triple modified as in the example of Table 7 may have a value in a range between 202 and 255. In this case, it is indicated that the operating triple is associated with a non-contiguous channel and the first octet of the operating triple has the same meaning as the channel power identifier of the sub-band triple of Table 6. That is, when the first octet of the operating triple has a value in a range between 202 to 255 (i.e., when the first octet is a channel power identifier), this can signal that the operating class and coverage class of the operating triple are applied to a non-contiguous channel corresponding to the value of the channel power identifier.

For example, let us assume in the example of FIG. 13(a) that the first non-contiguous channel (CH index 0) corresponds to a channel power identifier value of 202 and the second non-contiguous channel (CH index 1) corresponds to a channel power identifier value of 203. Let us also assume that CH1 of the first non-contiguous channel corresponds to operating class 0 and coverage class 0, CH3 of the first non-contiguous channel corresponds to operating class 3 and coverage class 1, CH4 of the second non-contiguous channel corresponds to operating class 3 and coverage class 1, and CH6 of the second non-contiguous channel corresponds to operating class 1 and coverage class 2. In this case, if a maximum allowable transmit power level of 100 mW is signaled through CH1 and CH3 of the first non-contiguous channel and a maximum allowable transmit power level of 40 mW is signaled through CH4 and CH6 of the second non-contiguous channel, the operating class and the sub-band triple of Table 7 may have values as shown in the following Table 8.

TABLE 8

| 1st octet | 2nd octet | 3rd octet |
|---|---|---|
| 202 | 0 | 0 |
| 202 | 1 | 100 |
| 202 | 3 | 1 |

TABLE 8-continued

| 1st octet | 2nd octet | 3rd octet |
|---|---|---|
| 202 | 3 | 100 |
| 203 | 3 | 1 |
| 203 | 4 | 40 |
| 203 | 1 | 2 |
| 203 | 6 | 40 |

The various examples of the country field triplets format which can signal the maximum allowable transmit power of a non-contiguous channel (or an individual channel belonging to a non-contiguous channel) when the maximum allowable transmit power is signaled through a country information element (see FIG. 1) have been described above with reference to Tables 1 to 8. However, the principle of the present invention is not limited to use of the country information element. That is, the principle of the present invention may be applied to a new format of information element.

For example, the new format of information element may be referred to as a channel power information element. Basically, the channel power information element may include a channel number field and a maximum transmit power level field of an individual channel belonging to a channel group (for example, a non-contiguous channel). The channel power information element may further include an operating class field and/or a coverage class field belonging to a non-contiguous channel (or an individual channel belonging to a non-contiguous channel). The channel power information element may further include an identifier field of a non-contiguous channel (for example, a channel index field as in the example of Table 3 or a channel power identifier field as in the example of Table 6 or Table 7). Alternatively, the channel power information element may not include an identifier field of a non-contiguous channel but may instead include a field indicating the number of individual channels belonging to a non-contiguous channel (for example, a Number of Channels field as in the example of Table 5).

FIG. 14 exemplarily illustrates a format of a channel power information element to which the present invention is applied. In examples of FIG. 14, the channel power information element need not include the Channel Power Identifier field (i.e., a field having a value which can identify a channel power triple) in the example of Table 3 or Table 5 and also need not include the coverage class field as appropriate. In all examples of FIG. 14, an Element ID field may have a value indicating the information element is a channel power information element and a Length field may have a value indicating the length of subsequent fields.

Specifically, FIG. 14(a) illustrates an example in which a channel power information element includes an identifier field of a non-contiguous channel (for example, a Channel Index field). For example, 4 fields, a Channel Index field, an Operating Class field, a Channel Number field, and a Maximum Transmit Power Lever field, may be repeated the same number of times as the number of individual channels whose maximum transmit power is to be signaled. The Channel Index field may have a value of an identifier a non-contiguous channel to which the individual channel belongs, the Operating Class field may have a value of an operating class to which the individual channel belongs, the Channel Number field may have a value of a channel number identifying the individual channel, and the Maximum Transmit Power Lever field may have a maximum transmit power value that is to be applied to the individual channel. Using the channel power information element of FIG. 14(a), it is possible to clearly indicate which individual channel belongs to which non-contiguous channel.

FIG. 14(b) illustrates an example in which a channel power information element includes a field indicating the number of individual channels (i.e., a Number of Channels field). In the example of FIG. 14(b), 3 fields, an Operating Class field, a Channel Number field, and a Maximum Transmit Power Lever field, may be repeated the same number of times as the number of individual channels whose maximum transmit power is to be signaled.

In the example of FIG. 14(b), the Number of Channels field may correspond to the number of individual channels which constitute one non-contiguous channel or may correspond to the number of individual channels whose maximum transmit power is signaled. In the former case, an additional repeated form may be included as shown in FIG. 14(c) in order to construct a channel power information element for a plurality of non-contiguous channels. In the latter case, the Number of Channels field does not clearly indicate that individual channels whose maximum transmit power is signaled constitute one non-contiguous channel but instead it is possible to signal the maximum transmit power of each individual channel with minimal overhead.

FIG. 14(c) shows a format of a channel power information element which signals the maximum transmit power of a plurality of non-contiguous channels when the Number of Channels field indicates the number of individual channels which constitute one non-contiguous channel. First, a Number of Channels field indicating the number of individual channels belonging to a first non-contiguous channel may be included subsequent to Element ID and Length fields and, subsequently, an Operating Class field, a Channel Number field, and a Maximum Transmit Power Level field may be repeated a number of times corresponding to the value of the Number of Channels filed of the first non-contiguous channel. Next, a Number of Channels field of a second non-contiguous channel may be included and, subsequently, an Operating Class field, a Channel Number field, and a Maximum Transmit Power Level field may be repeated a number of times corresponding to the value of the Number of Channels filed of the second non-contiguous channel.

Figure 15:
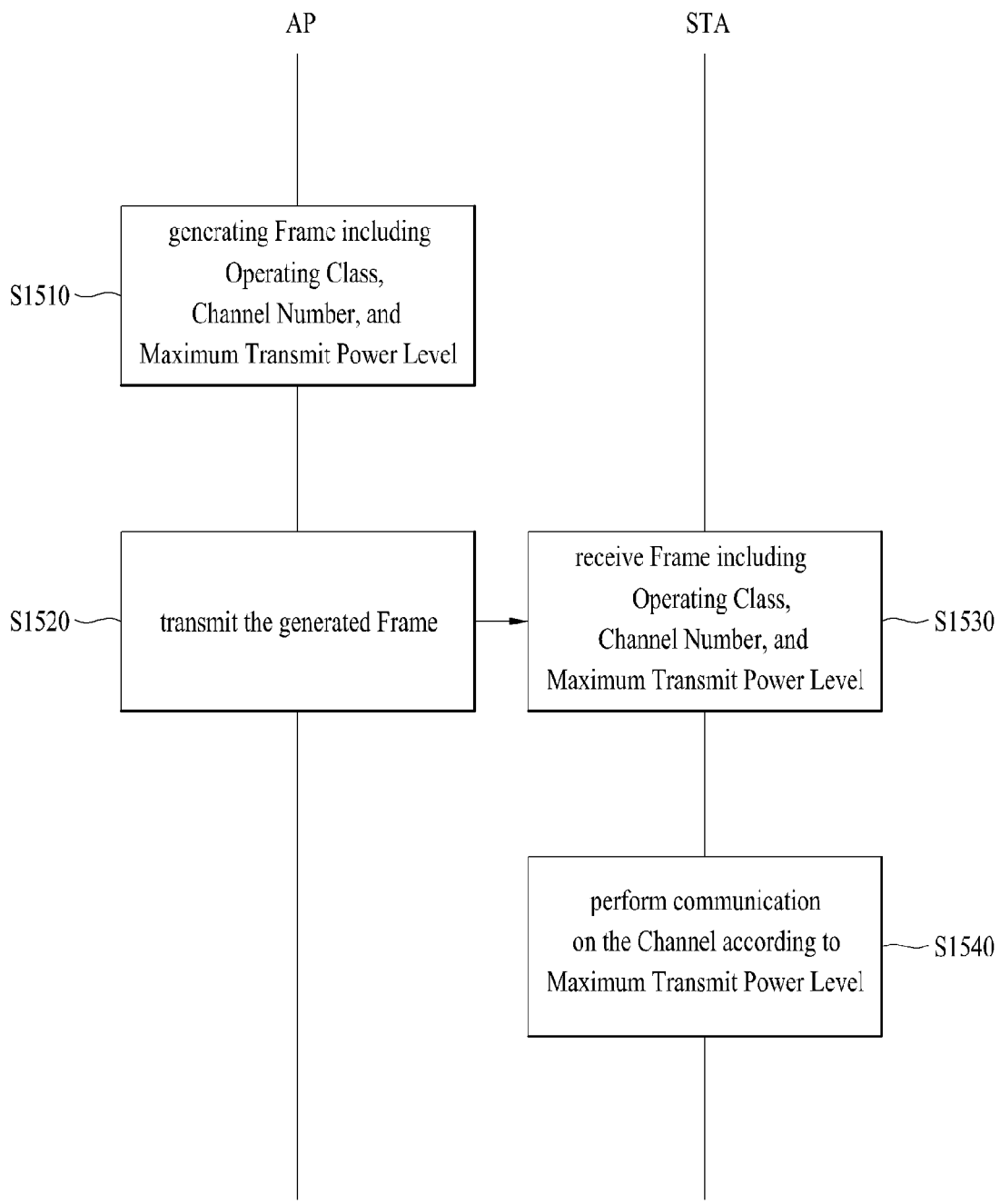
FIG. 15 illustrates a method of transmitting and receiving maximum transmit power information according to an example of the present invention.

FIG. 15 illustrates a method of transmitting and receiving maximum transmit power information according to an example of the present invention.

In step S1510, an AP may generate a frame including an Operating Class field, a Channel Number field, and a Maximum Transmit Power Level field. This frame may be used to signal the maximum transmit power level of each individual channel of a non-contiguous channel (i.e., a channel group including individual channels which are non-contiguous in the frequency domain). The frame may further include a Channel Group Identifier field (the Channel Index field in the example of Table 3 or the Channel Power Identifier field in the example of Table 6 or Table 7). The frame may further include a field associated with the number of channels included in the channel group.

In step S1520, the AP may transmit the frame generated in step S1510 to an STA and, in step S1530, the STA may receive the frame from the AP.

In step S1540, the STA may perform communication through a specific channel according to maximum allowable transmit power indicated for the channel using information included in the frame received from the AP. Accordingly, the STA can smoothly perform communication in the whitespace while avoiding interference to an adjacent incumbent user.

The method of transmitting and receiving maximum transmit power according to an example of the present invention described above with reference to FIG. 15 may be implemented such that the features of each of the various embodiments of the present invention described above are independently applied to the method or 2 or more of the various embodiments of the present invention are simultaneously applied to the method and redundant descriptions are omitted herein for clear explanation of the present invention.

Figure 16:
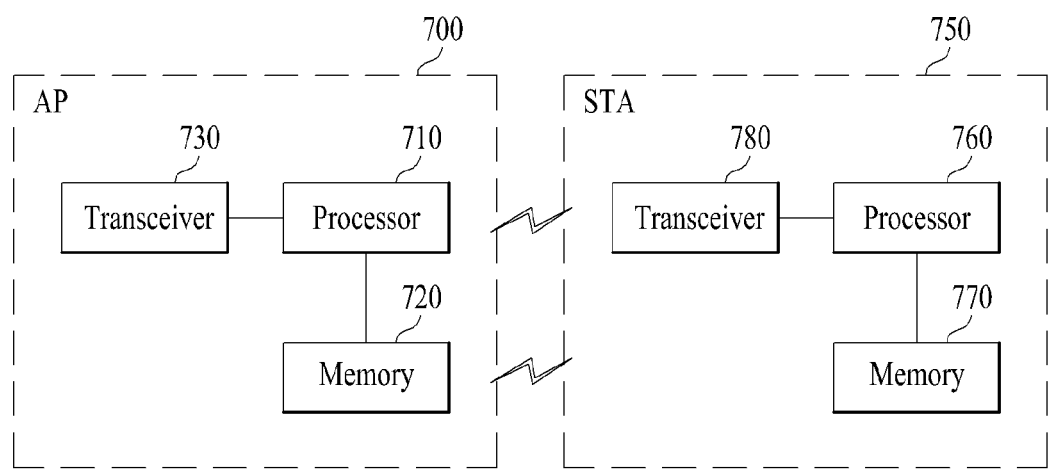
FIG. 16 is a block diagram illustrating a configuration of a wireless device according to an embodiment of the present invention.

FIG. 16 is a block diagram illustrating a configuration of a wireless device according to an embodiment of the present invention.

An AP 700 may include a processor 710, a memory 720, and a transceiver 730. An STA 750 may include a processor 760, a memory 770, and a transceiver 780. The transceivers 730 and 780 may transmit/receive radio signals and may be implement, for example, a physical layer according to the IEEE 802 system. The processors 710 and 760 are connected to the transceivers 730 and 760 and may implement a physical layer and/or a MAC layer according to the IEEE 802 system. The processor 710 may control operations of the AP for generating and transmitting an information element (or frame) including maximum allowable transmit power information according to the various embodiments of the present invention described above. The processor 760 may control the STA to receive an information element (or frame) including maximum allowable transmit power information according to the various embodiments of the present invention described above and to perform communication through a specific channel according to a maximum allowable transmit power level indicated for the channel according to a value indicated by the information element (or frame). The processors 710 and 760 may be configured to perform wireless communication through the transceivers 730 and 780. Modules for implementing operations of the AP and the STA according to the various embodiments of the present invention described above may be stored in the memories 720 and 770 and may be executed by the processors 710 and 760. The memories 720 and 770 may be included in the processors 710 and 760 or may be installed outside the processors 710 and 760 and may be connected to the processors 710 and 760 through a known means.

The detailed configurations of the AP and the STA described above may be implemented such that each of the various embodiments of the present invention described above is independently applied or 2 or more thereof are simultaneously applied to the AP and the STA and redundant descriptions are omitted herein for clear explanation of the present invention.

The embodiments of the present invention described above may be implemented by various means. For example, the embodiments of the present invention may be implemented by hardware, firmware, software, or any combination thereof.

In the case in which the present invention is implemented by hardware, the methods according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. Software code can be stored in a memory unit so as to be executed by a processor. The memory unit may be located inside or outside the processor and can communicate data with the processor through a variety of known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although the various embodiments of the present invention have been described above mainly with reference to an IEEE 802.11 system, the present invention may be applied in the same manner to various mobile communication systems.

The invention claimed is:

1. A method for transmitting, by a device, operating class information for two frequency segments having an equal width, the method comprising:
    transmitting, by the device, a first operating/subband sequence and a second operating/subband sequence,
    wherein the first operating/subband sequence and the second operating/subband sequence identify the operating class information for the two frequency segments having the equal width,
    wherein the first operating/subband sequence includes a first operating triplet that identifies a first behavior mode of a first of the two frequency segments having the equal width, and
    wherein the second operating/subband sequence includes a second operating triplet that identifies a second behavior mode of a second of the two frequency segments having the equal width.

2. The method of claim 1, wherein the first operating/subband sequence and the second operating/subband sequence are consecutive sequences.

3. The method of claim 1, wherein the first operating/subband sequence and the second operating/subband sequence are transmitted in a frame.

4. The method according to claim 3,
    wherein the identifier field includes an integer value of 201 or greater.

5. The method of claim 1, wherein the first behavior mode is different from the second behavior mode.

6. The method according to claim 1,
    wherein a value of a sub-field of the first operating triplet indicates that the operating class information is for the two frequency segments having the equal width.

7. The method according to claim 1,
    wherein each of the first operating triplet and the second operating triplet includes identifier field, operating class field and coverage class field.

8. The method according to claim 1,
    wherein the two frequency segments are non-contiguous in a frequency domain.

9. The method according to claim 1,
    wherein the first operating/subband sequence and the second operating/subband sequence are included in a country element in a frame.

10. A method for receiving, by a device, operating class information for two frequency segments having an equal width, the method comprising:
    receiving, by the device, a frame including a first operating/subband sequence and a second operating/subband sequence,
    wherein the first operating/subband sequence and the second operating/subband sequence identify the operating class information for the two frequency segments having the equal width,
    wherein the first operating/subband sequence includes a first operating triplet that identifies a first behavior mode of a first of the two frequency segments having the equal width, and
    wherein the second operating/subband sequence includes a second operating triplet that identifies a second behavior mode of a second of the two frequency segments having the equal width.

11. An apparatus for transmitting operating class information, the apparatus comprising:
    a transceiver; and
    a processor operatively connected to the transceiver and configured to receive a frame including a first operating/subband sequence and a second operating/subband sequence,
    wherein the first operating/subband sequence and the second operating/subband sequence identify the operating class information for thefor two frequency segments having thehaving an equal width,
    wherein the first operating/subband sequence includes a first operating triplet that identifies a first behavior mode of a first of the two frequency segments having the equal width, and
    wherein the second operating/subband sequence includes a second operating triplet that identifies a second behavior mode of a second of the two frequency segments having the equal width.

12. An apparatus for receiving operating class information, the apparatus comprising:
    a transceiver; and
    a processor operative connected to the transceiver and configured to transmit a frame including a first operating/subband sequence and a second operating/subband sequence,
    wherein the first operating/subband sequence and the second operating/subband sequence identify the operating class information for thefor two frequency segments having thehaving an equal width,
    wherein the first operating/subband sequence includes a first operating triplet that identifies a first behavior mode of a first of the two frequency segments having the equal width, and
    wherein the second operating/subband sequence includes a second operating triplet that identifies a second behavior mode of a second of the two frequency segments having the equal width.

* * * * *